(12) United States Patent
Nakabayashi et al.

(10) Patent No.: US 10,521,490 B2
(45) Date of Patent: Dec. 31, 2019

(54) EQUIPMENT MAINTENANCE MANAGEMENT SYSTEM AND EQUIPMENT MAINTENANCE MANAGEMENT METHOD

(71) Applicant: YOKOGAWA ELECTRIC CORPORATION, Tokyo (JP)

(72) Inventors: Akio Nakabayashi, Tokyo (JP); Keisuke Shimpuku, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 209 days.

(21) Appl. No.: 15/183,359

(22) Filed: Jun. 15, 2016

(65) Prior Publication Data

US 2017/0003667 A1 Jan. 5, 2017

(30) Foreign Application Priority Data

Jul. 3, 2015 (JP) .................................. 2015-134381

(51) Int. Cl.
*G06F 11/30* (2006.01)
*G21C 17/00* (2006.01)
*G06F 17/18* (2006.01)

(52) U.S. Cl.
CPC .................................... *G06F 17/18* (2013.01)

(58) Field of Classification Search
CPC .... G06F 17/18; G06Q 10/06; G06Q 10/0639; G06Q 10/20
USPC ........................................................ 702/184
See application file for complete search history.

(56) References Cited

U.S. PATENT DOCUMENTS

| 5,817,958 A * | 10/1998 | Uchida | G21C 7/36 73/865.9 |
| 5,914,875 A * | 6/1999 | Monta | G05B 23/0272 376/245 |
| 2010/0011251 A1* | 1/2010 | Mannar | G16H 40/40 714/32 |

(Continued)

FOREIGN PATENT DOCUMENTS

| JP | 2006-300712 A | 11/2006 |
| JP | 2009-003517 A | 1/2009 |

(Continued)

OTHER PUBLICATIONS

English translation of JP 2006-300712. (Year: 2006).*

(Continued)

*Primary Examiner* — Michael P Nghiem
(74) *Attorney, Agent, or Firm* — Sughrue Mion, PLLC

(57) ABSTRACT

A system includes: a monitoring data obtainer configured to obtain real-time monitoring data regarding equipment; a deterioration index calculator configured to calculate an estimated deterioration index of the equipment from an equipment model and the obtained monitoring data, the equipment model being created by modeling a relationship between the real-time monitoring data of the equipment in a normal state; a time change predictor configured to predict a time change of the estimated deterioration index; and a scheduler configured to estimate a cost in a future caused by the abnormal event, the cost being estimated based on the predicted time change of the estimated deterioration index and the relationship between the estimated deterioration index and the probability of the abnormal event.

7 Claims, 9 Drawing Sheets

(56) References Cited

U.S. PATENT DOCUMENTS

| | | | |
|---|---|---|---|
| 2012/0290879 A1 | 11/2012 | Shibuya et al. | |
| 2014/0310228 A1* | 10/2014 | Nakabayashi | G06N 7/005 706/52 |
| 2019/0087741 A1* | 3/2019 | Wu | G06N 20/20 |

FOREIGN PATENT DOCUMENTS

| | | |
|---|---|---|
| JP | 2009-217718 A | 9/2009 |
| JP | 2013-152655 A | 8/2013 |
| JP | 2014-59910 A | 4/2014 |

OTHER PUBLICATIONS

English translation of JP 2014-059910. (Year: 2014).*
K. Funatsu et al., "Fault detection and fault state estimation based on ensemble learning in industrial plants" (P020), 39th Symposium on Chemoinformatics hosted by Division of Chemical Information and Computer Science, The Chemical Society of Japan, Sep. 29-30, 2016, Hamamatsu, Japan.

\* cited by examiner

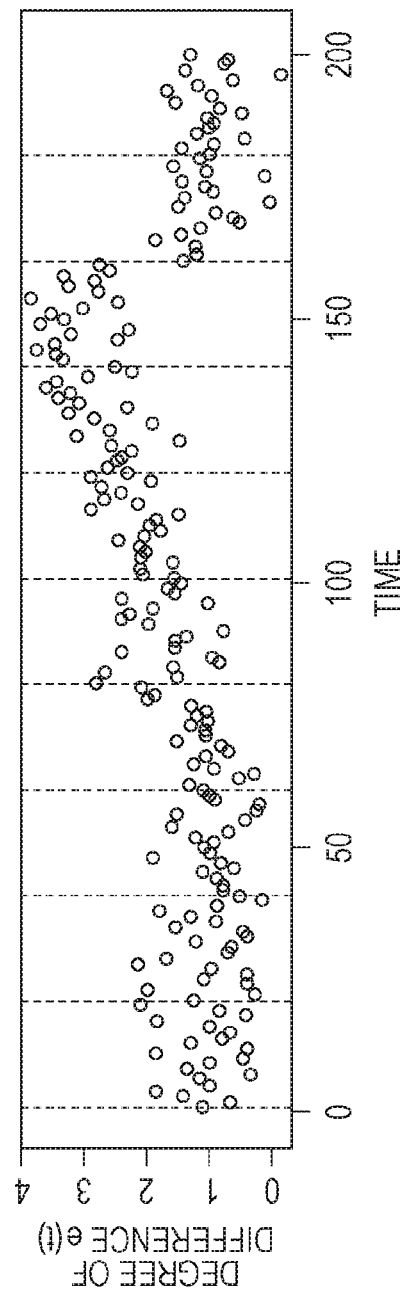
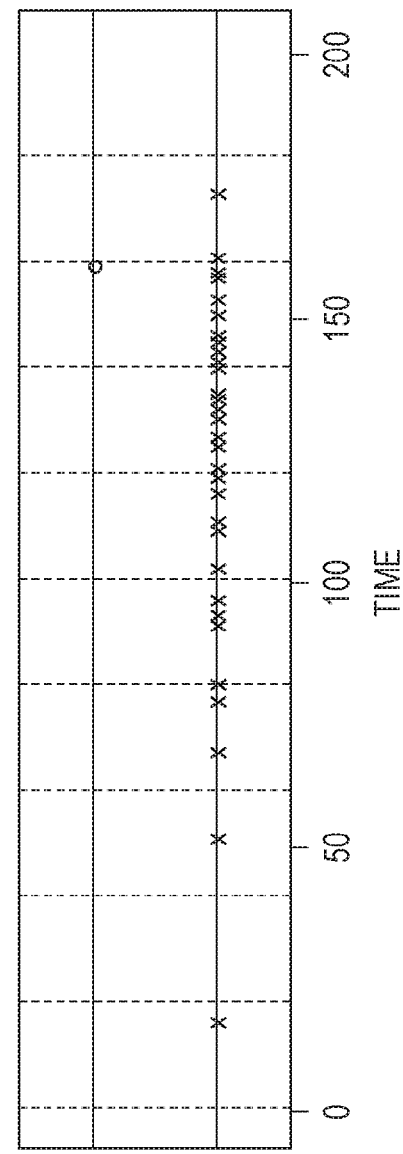

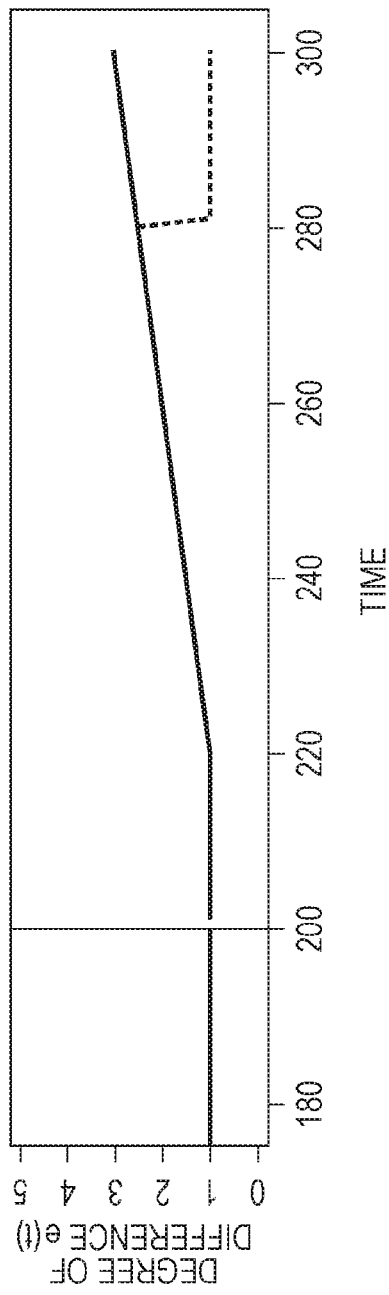
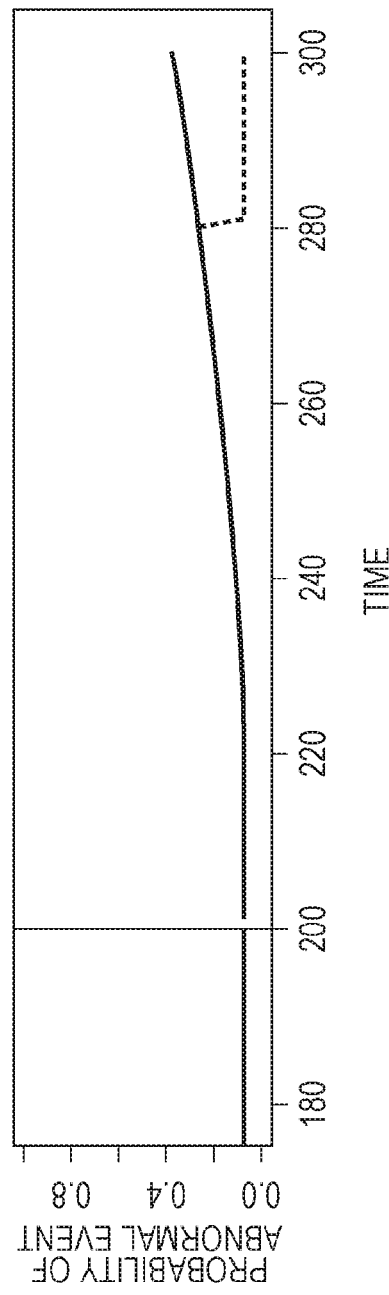

EQUIPMENT MAINTENANCE MANAGEMENT SYSTEM AND EQUIPMENT MAINTENANCE MANAGEMENT METHOD

CROSS-REFERENCE TO RELATED APPLICATION

This application claims priority from Japanese Patent Application No. 2015-134381 filed with the Japan Patent Office on Jul. 3, 2015, the entire content of which is hereby incorporated by reference.

BACKGROUND

1. Technical Field

The present disclosure relates to an equipment maintenance management system and an equipment maintenance management method.

2. Description of the Related Art

A plant and the like include various kinds of equipment. For normal operation of the equipment, the equipment is maintained. For maintenance of the equipment, some extent of man-hour and cost are taken. Therefore, maintaining indeteriorated equipment is inefficient. Meanwhile, neglecting maintenance of deteriorated equipment causes a possibility of frequent abnormities in this equipment and making this equipment inoperable. These problems cause a failure of smooth plant operation. In view of this, a prediction of a deteriorated state of the equipment and designing an efficient maintenance plan are required.

For example, a technique related to a maintenance plan of equipment is disclosed in JP-A-2006-300712. The system disclosed in this patent publication decides the time change model of the deterioration index based on the inspection data obtained through periodic inspection. Furthermore, a residual life of equipment is predicted.

A technique that estimates a change in equipment based on real-time monitoring data regarding a temperature, a flow rate, a pressure, a vibration, and the like of target equipment, not the inspection data, has also been proposed. For example, the technique disclosed in JP-A-2014-59910 uses the principal component analysis to model a relationship between monitoring data of equipment in a normal state. Based on this model, statistics referred to as a T2 statistic and a Q statistic are evaluated. This finds a degree of difference from the normal state. Using this degree of difference, the state of the equipment is monitored.

SUMMARY

An equipment maintenance management system includes: a monitoring data obtainer configured to obtain real-time monitoring data regarding equipment; an equipment abnormal event information obtainer configured to obtain abnormal event information, the abnormal event information being information on an abnormal event occurred in the equipment; a deterioration index calculator configured to calculate an estimated deterioration index of the equipment from an equipment model and the obtained monitoring data, the equipment model being created by modeling a relationship between the real-time monitoring data of the equipment in a normal state; a time change predictor configured to predict a time change of the estimated deterioration index; a relationship evaluator configured to statistically evaluate a relationship between the estimated deterioration index and a probability of the abnormal event; and a scheduler configured to estimate a cost in a future caused by the abnormal event, the cost being estimated based on the predicted time change of the estimated deterioration index and the relationship between the estimated deterioration index and the probability of the abnormal event.

BRIEF DESCRIPTION OF THE DRAWINGS

FIGS. 4A and B are drawings describing a learning example of an abnormal event model;

FIG. 7A is an explanatory view illustrating a time change of the degree of difference when maintenance is performed and not performed, and FIG. 7B is an explanatory view illustrating a time change of a probability of an abnormal event when the maintenance is performed and not performed;

DESCRIPTION OF THE EMBODIMENTS

Figure 1:
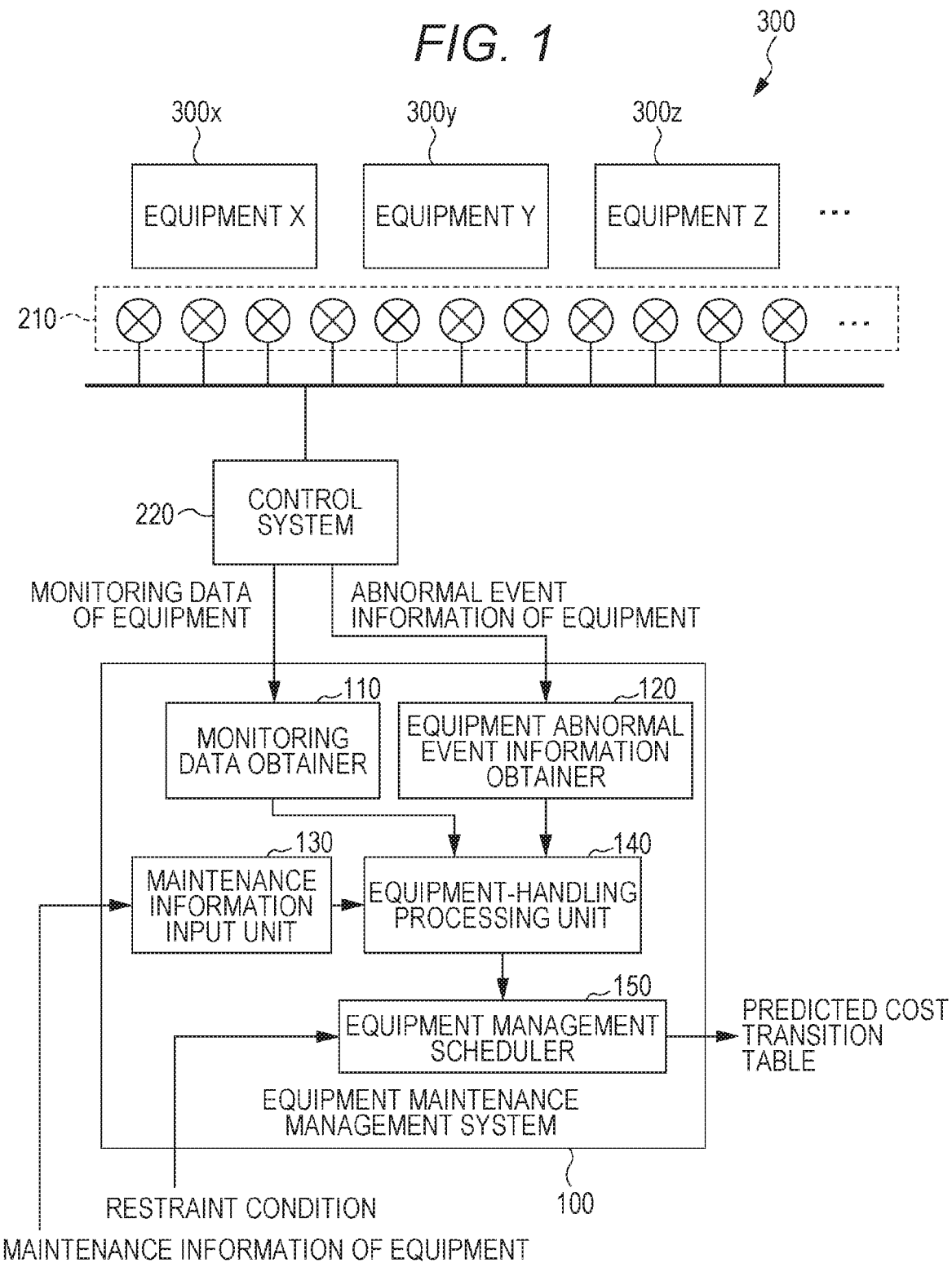
FIG. 1 is a block diagram describing an outline of an equipment maintenance management system according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The technique disclosed in JP-A-2006-300712 decides the time change model of the deterioration index based on the inspection data obtained through the periodic inspection. However, generally, equipment is periodically inspected at long-term intervals such as year units. Accordingly, a real-time change in the equipment may be missed. The deterioration index based on an actually measured value obtained through the inspection is not always clear. Therefore, a direct deterioration model may be failed to be configured.

The technique disclosed in JP-A-2014-59910 models the relationship between the monitoring data in the normal state. Based on this model, the degree of difference from the normal state is evaluated as an estimated value of the deterioration index. This method ensures real-time monitoring of a change in a tendency of the equipment. However, the deterioration index thus estimated merely expresses a statistical property of the equipment itself. That is, this deterioration index is not always related to the deterioration of the equipment.

One object of the present disclosure is to provide the following equipment maintenance management system and equipment maintenance management method. These system and method statistically evaluate a relationship between an estimated deterioration index, which is a deterioration index of equipment estimated from monitoring data, and an abnormal event. This ensures further clarifying meaning of the estimated deterioration index and designing an appropriate maintenance plan.

An equipment maintenance management system according to one aspect of the present disclosure includes: a monitoring data obtainer configured to obtain real-time monitoring data regarding equipment; an equipment abnormal event information obtainer configured to obtain abnormal event information, the abnormal event information being information on an abnormal event occurred in the equipment; a deterioration index calculator configured to calculate an estimated deterioration index of the equipment from an equipment model and the obtained monitoring data, the equipment model being created by modeling a relationship between the real-time monitoring data of the equipment in a normal state; a time change predictor configured to predict a time change of the estimated deterioration index; a relationship evaluator configured to statistically evaluate a relationship between the estimated deterioration index and a probability of the abnormal event; and a scheduler configured to estimate a cost in a future caused by the abnormal event, the cost being estimated based on the predicted time change of the estimated deterioration index and the relationship between the estimated deterioration index and the probability of the abnormal event.

Here, the scheduler can simulate a cost transition when equipment maintenance is performed.

At this time, the scheduler can optimize execution timing of the equipment maintenance based on the simulation for the cost transition.

Further, the relationship evaluator can statistically evaluate the relationship between the estimated deterioration index and the probability of the abnormal event considering presence/absence of maintenance for the equipment.

An equipment maintenance management method according to one aspect of the present disclosure includes: obtaining real-time monitoring data regarding equipment; obtaining abnormal event information, the abnormal event information being information on an abnormal event occurred in the equipment; calculating an estimated deterioration index of the equipment from an equipment model and the obtained monitoring data, the equipment model being created by modeling a relationship between the real-time monitoring data of the equipment in a normal state; predicting a time change of the estimated deterioration index; statistically evaluating a relationship between the estimated deterioration index and a probability of the abnormal event; and estimating a cost in a future caused by the abnormal event, the cost being estimated based on the predicted time change of the estimated deterioration index and the relationship between the estimated deterioration index and the probability of the abnormal event.

The above-described equipment maintenance management system and equipment maintenance management method statistically evaluate the relationship between the estimated deterioration index, which is the deterioration index of the equipment estimated from the monitoring data, and the abnormal event. This ensures further clarifying the meaning of the estimated deterioration index and designing the appropriate maintenance plan.

The following describes embodiments of the present disclosure with reference to the drawings. FIG. 1 is a block diagram describing an outline of an equipment maintenance management system 100 according to the embodiment.

As illustrated in FIG. 1, a plant includes various pieces of equipment 300 (equipment X300x, equipment Y300y, equipment Z300z, and so on). In the plant, various kinds of field instruments 210 are installed. These field instruments 210 operate the equipment 300 with actuators and the like and obtain measurement data regarding the equipment 300 using various kinds of sensors and the like. Alternatively, the field instrument 210 itself may be the actuator, the various kinds of sensors, and the like.

The field instruments 210 are coupled to a control system 220 over a field bus and the like. The control system 220 controls the field instruments 210. The control system 220 collects measured data obtained by the field instruments 210 and the like as monitoring data of the equipment 300.

The equipment maintenance management system 100 may be a general-purpose information processing apparatus and the like such a PC, which includes a CPU, a, memory, and an input/output device. The equipment maintenance management system 100 includes a monitoring data obtainer 110, an equipment abnormal event information obtainer 120, a maintenance information input unit 130, an equipment-handling processing unit 140, and an equipment management scheduler 150.

The monitoring data obtainer 110 obtains the monitoring data of the equipment 300 real-time from the control system 220. The monitoring data, for example, includes a temperature, a flow rate, a pressure, a vibration, a current value, a voltage value, a torque, and an absorbance spectrum of the equipment 300.

The equipment abnormal event information obtainer 120 obtains information on the abnormal event occurred in the equipment 300. The abnormal event includes, for example, an actuation of an alarm and an operation stop of the equipment 300. The equipment abnormal event information obtainer 120, for example, can obtain the abnormal event via the control system 220. The equipment abnormal event information obtainer 120 may obtain the abnormal event from another system such as a maintenance recording system. Alternatively, the equipment abnormal event information obtainer 120 may accept (obtain) information corresponding to occurrence of the abnormal event input by an operator.

The maintenance information input unit 130 accepts (obtains) maintenance information input to the equipment 300 by the operator and the like. The maintenance information input unit 130 may receive the maintenance information from another system such as the maintenance recording system. The maintenance information, for example, includes information to identify the equipment 300 subject to maintenance and information on a maintenance date.

Figure 2:
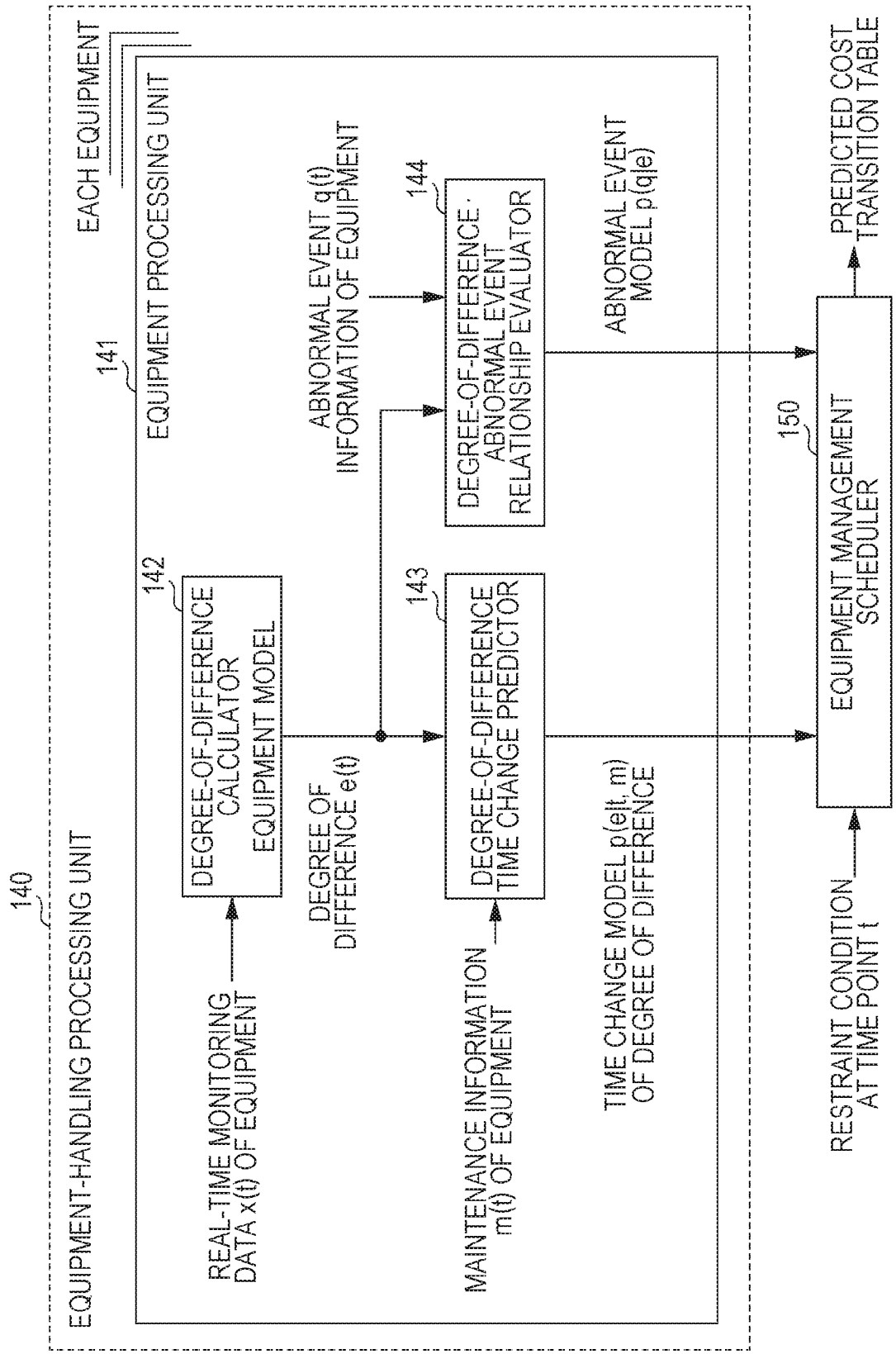
FIG. 2 is a block diagram describing an equipment-handling processing unit.

The equipment-handling processing unit 140 is a block that performs a process corresponding to the equipment 300. FIG. 2 is a block diagram describing the equipment-handling processing unit 140. As illustrated in FIG. 2, the equipment-handling processing unit 140 includes an equipment processing unit 141 corresponding to each kind of the equipment 300. The equipment processing units 141 are prepared for the respective pieces of equipment 300 disposed in the plant.

As illustrated in FIG. 2, the equipment processing unit 141 includes a degree-of-difference calculator 142, a degree-of-difference time change predictor 143, and a degree-of-difference-abnormal event relationship evaluator 144.

The degree-of-difference calculator (the deterioration index calculator) 142 calculates (estimates) the estimated deterioration index (a degree of difference e(t)) of the equipment 300 from the equipment model and the obtained monitoring data. That is, the degree-of-difference calculator 142 includes the defined equipment model. The degree-of-difference calculator 142 is a block that calculates (estimates) the degree of difference e(t) based on real-time monitoring data x(t) and the equipment model. The real-time monitoring data x(t) is the monitoring data of the equipment obtained by the monitoring data obtainer 110 at a time point t. The degree of difference e(t) is used as the estimated deterioration index of the equipment. That is, the deterioration index according to the embodiment is not the deterioration index obtained directly from the actually measured value but is a degree of difference as an estimated deterioration index calculated (estimated) from the equipment model and the monitoring data.

Figure 3:
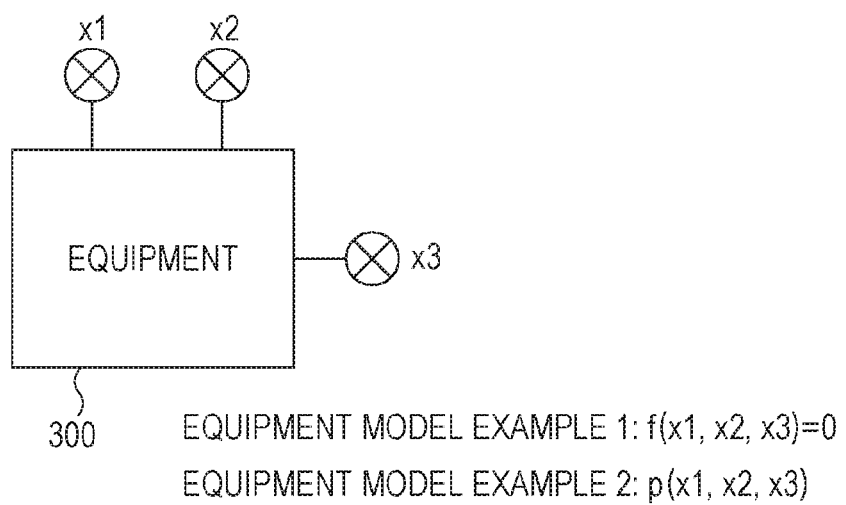
FIG. 3 is a drawing describing an equipment model.

Here, the equipment model is obtained by modeling the relationship between the real-time monitoring data of the equipment 300 in the normal state. That is, the equipment model is a model expressing a behavior of the equipment 300 in the normal state by a relational expression using the monitoring data. The example of the equipment model is illustrated in FIG. 3. As illustrated in FIG. 3, assume that monitoring data x1, x2, and x3 of the certain equipment 300 in the normal state are obtained. The equipment model construed in this case may be a deterministic model (an equipment model example 1) expressed by the relational expression meeting f(x1, x2, x3)=0 or may be a stochastic model (an equipment model example 2) allowing a variation of data like: p(x1, x2, x3).

The deterministic model can be created using a linear relational expression such as multiple regression analysis and principal component analysis or a nonlinear relational expression such as polynomial regression, kernel regression, and neural network. When a physical property of the equipment 300 is known, the deterministic model can be created using a physical model based on knowledge of the known physical property. The stochastic model, for example, may be a model obtained by employing an output of the deterministic model as an average value and adding Gaussian observation noise to this average value.

When the deterministic model like, for example, f(x)=0 is employed as the equipment model, the degree of difference e(t) can be defined as a residual error, which is an amount of variation from this relational expression. When the relational expression for the equipment model is given as simultaneous equations, the residual error becomes a multidimensional vector. In view of this, a square sum of the residual error and the like can be used as the degree of difference e(t).

When the stochastic model p(x) is employed as the equipment model, the degree of difference e(t) may be a likelihood of data on this stochastic model. The degree of difference e(t) has a possibility of indicating irregular variations due to disturbance and the like. In view of this, an averaging process such as passing through a low-pass filter may be performed on the output of the degree of difference e(t).

The degree-of-difference-abnormal event relationship evaluator (the relationship evaluator) 144 statistically evaluates a relationship between the degree of difference e(t) and a probability of the abnormal event. That is, the degree-of-difference-abnormal event relationship evaluator 144 is a block creating a stochastic abnormal event model p(q|e) through learning. The stochastic abnormal event model p(q|e) statistically associates the degree of difference e(t), which is calculated by the degree-of-difference calculator 142, with the abnormal event q(t) regarding the equipment, which is obtained by the equipment abnormal event information obtainer 120. That is, the degree-of-difference-abnormal event relationship evaluator 144 models a statistical relationship between the degree of difference e(t) used as an estimated degree-of-deterioration index and a probability of the abnormal event of the equipment. By this modeling, the degree-of-difference-abnormal event relationship evaluator 144 establishes the abnormal event model p(q|e). The degree-of-difference-abnormal event relationship evaluator 144 can update the abnormal event model p(q|e) sequentially.

The abnormal event model p(q|e) at a start is any given model. Any given method for updating the abnormal event model p(q|e) is employed. The degree-of-difference-abnormal event relationship evaluator 144 can establish the abnormal event model p(q|e) using, for example, logistic regression analysis and the neural network.

The degree-of-difference-abnormal event relationship evaluator 144 can use various kinds of posterior distribution estimation methods for update of the abnormal event model p(q|e). For example, the degree-of-difference-abnormal event relationship evaluator 144 can also use (nonlinear) Kalman filter for update of the abnormal event model p(q|e). Furthermore, the degree-of-difference-abnormal event relationship evaluator 144 can sequentially apply a Markov Chain Monte Carlo method or a Variational Bayesian method for update of the abnormal event model p(q|e). At timing of updating the abnormal event model p(q|e), the degree-of-difference-abnormal event relationship evaluator 144 may refer to a separately established equipment database. Furthermore, the degree-of-difference|abnormal event relationship evaluator 144 may batch-update historical data, not a sequential update.

The following describes an example of learning the abnormal event model p(q|e) by the degree-of-difference-abnormal event relationship evaluator 144. Assume that the degrees of difference e(t) at the respective time points t as illustrated in FIG. 4A and the abnormal events q(t) as illustrated in FIG. 4B are obtained. FIG. 4B illustrates the occurrence of the abnormal event q(t) by x while execution of maintenance by o.

Figure 5:
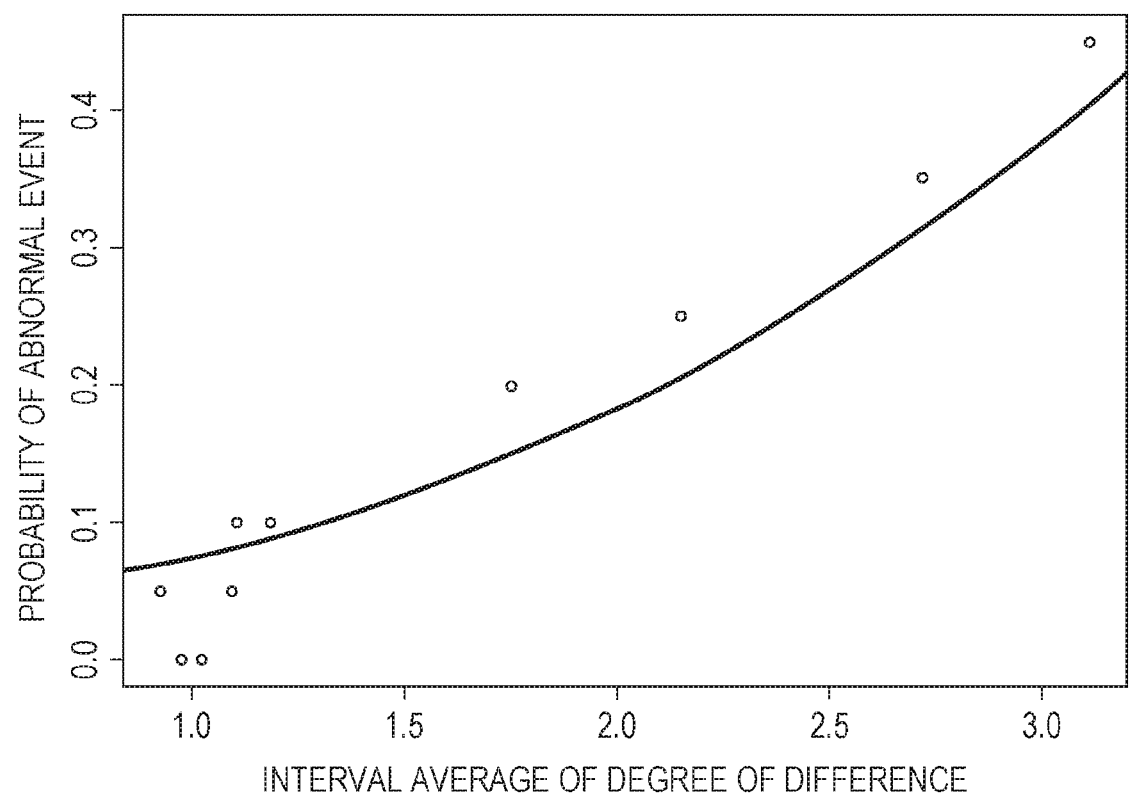
FIG. 5 is a drawing illustrating an estimation example of the abnormal event model by curve approximation.

Here, for example, time segments like being divided by the dotted lines in FIG. 4A and FIG. 4B are assumed. This ensures obtaining a sample of an interval average value of the degree of difference e(t) and a sample of the probability of the abnormal event per unit time in the interval. Based on these samples, for example, a curve approximation can be performed as illustrated in FIG. 5. This ensures creating the abnormal event model p(q|e). Thus, the degree-of-difference-abnormal event relationship evaluator 144 can statistically evaluate (establish the abnormal event model p(q|e)) the relationship between the degree of difference e(t) and the probability of abnormal event considering presence/absence of maintenance for the equipment 300.

A degree-of-difference time change predictor (a time change predictor) 143 predicts a time change of the degree of difference e(t). That is, the degree-of-difference time change predictor 143 is a block that creates a stochastic time change model p(e|t, m) of the degree of difference e(t) based on logs of the degree of difference e(t) through learning. The degree-of-difference time change predictor 143 can sequentially update the stochastic time change model p(e|t, m). The use of the stochastic time change model p(e|t, m) of the degree of difference e(t) can predict a future time change of the degree of difference e(t).

There is a possibility that the maintenance to the equipment 300 discontinuously changes a property regarding the deterioration index of the equipment 300. In view of this, the degree-of-difference time change predictor 143 may use maintenance information m(t) of the equipment 300 for analysis. For example, in the example illustrated in FIG. 4B, after a repair of the equipment by the maintenance indicated by o, the degree of difference e(t) clearly reduces. The reference to the maintenance information m(t) ensures specifying a factor of such change. Furthermore, dividing a model period and the like ensures establishing an accurate time change model.

The time change model p(e|t, m) at a start of learning is any given model. A method for updating the time change model p(e|t, m) is also any given method. As the time change model p(e|t, m), for example, the use of a linear model that keeps monotonously increasing with respect to the time, a logistic model where the change is saturated with respect to the time, and a Weibull distribution well-known as a model for a failure rate is considered. The degree-of-difference time change predictor 143 can use a piecewise model with respect to the time such as a hidden Markov model as the time change model p(e|t, m) to model the discontinuous change in the property.

The degree-of-difference time change predictor 143 can use various kinds of posterior distribution estimation methods for update of the time change model p(e|t, m) similar to the degree-of-difference-abnormal event relationship evaluator 144. For example, the degree-of-difference time change predictor 143 can also use the (nonlinear) Kalman filter for update of the time change model p(e|t, m). Furthermore, the degree-of-difference time change predictor 143 can sequentially apply the Markov Chain Monte Carlo method or the Variational Bayesian method for update of the time change model p(e|t, m). At timing of updating the time change model p(e|t, m), the degree-of-difference time change predictor 143 may refer to a separately established equipment database. Furthermore, the degree-of-difference time change predictor 143 may batch-update historical data, not a sequential update.

A method for expressing the maintenance information m(t) of the equipment 300 is any given method. The degree-of-difference time change predictor 143 may systematize and code a measure performed on the equipment 300 to form the maintenance information m(t). The coding for forming the maintenance information m(t) may be a coding that expresses an execution state of a repair with two values.

Figure 6:
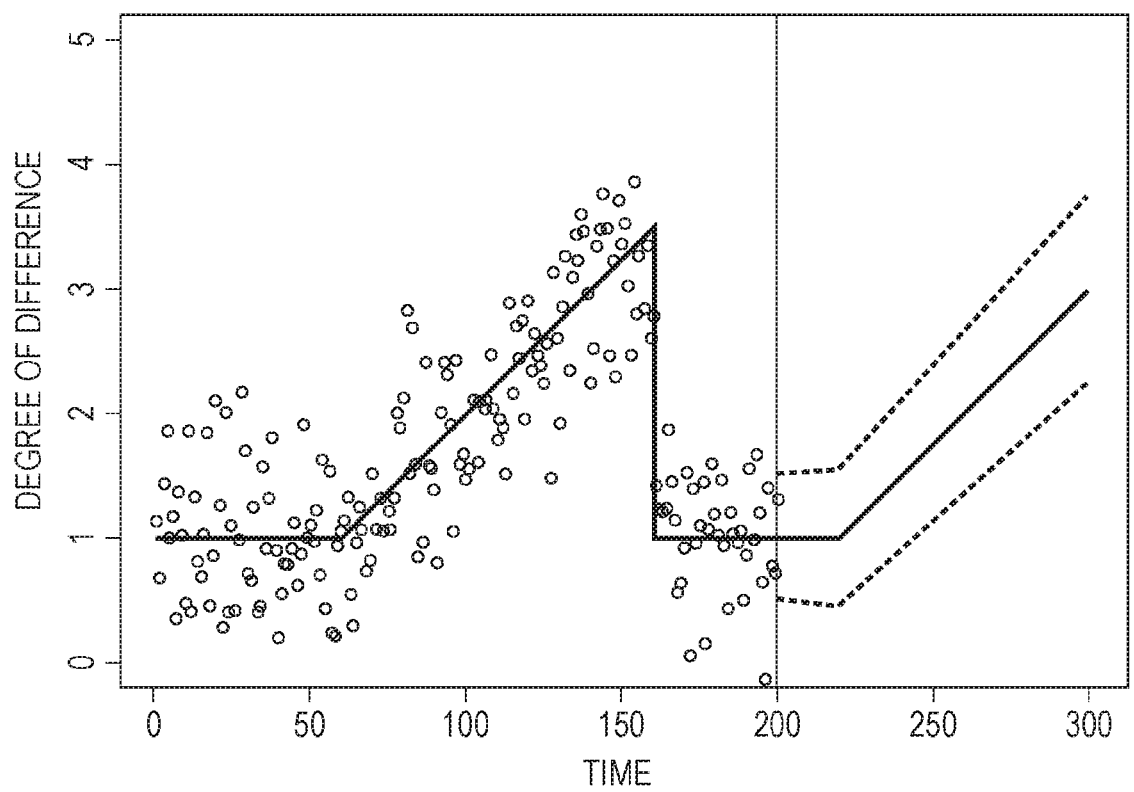
FIG. 6 is a drawing illustrating an example of a time change model of a degree of difference.

FIG. 6 is a drawing illustrating an example of the time change model p(e|t, m) of the degree of difference e(t). The horizontal axis indicates the time while the vertical axis indicates the degree of difference e(t). Here, the time point of 200 at which the vertical line is drawn is assumed as the current time. The solid line on the right of the vertical line indicates an expected value of the predicted value based on the time change model p(e|t, m) estimated by this block (the degree-of-difference time change predictor 143). The dotted lines indicate predicted confidence intervals in the future. The equipment-handling processing unit 140 is described above with reference to FIGS. 2 to 6.

Now returning to the explanation in FIG. 1, the equipment management scheduler 150 estimates a cost in the future caused by the abnormal event based on the predicted time change of the degree of difference e(t) and the relationship between the degree of difference e(t) and the probability of the abnormal event. The equipment management scheduler 150 also can simulate a cost transition when the equipment 300 is maintained. Furthermore, the equipment management scheduler 150 also can optimize execution timing of equipment maintenance based on the simulation for cost transition.

That is, the equipment management scheduler 150 is a block that accepts the time change model p(e|t, m) of the degree of difference e(t), the abnormal event model p(q|e), the cost in case of a failure, the maintenance cost, a restraint condition at the present, and the like to create the predicted cost transition table of the equipment 300. For example, the operator inputs the restraint condition. The cost in case of the failure and the maintenance cost can be set to a standard amount of money regarding the equipment 300.

For example, as illustrated in FIG. 7A, the equipment management scheduler 150 uses the time change model p(e|t, m) of the degree of difference e(t) to ensure a prediction of how the degree of difference e(t) changes in the case where maintenance is not performed (the solid line in FIG. 7A) and in the case where the maintenance is performed at a certain time point (the dashed line in FIG. 7A). It is assumed that, when the maintenance is performed, the degree of difference e(t) changes to the lowest level in the past.

Here, the equipment management scheduler 150 can also use the abnormal event model p(q|e), which indicates the relationship between the degree of difference e(t) and the probability of abnormal event. In this case, as illustrated in FIG. 7B, the equipment management scheduler 150 can simultaneously predict the time change of the probability of abnormal event corresponding to the predicted time change of the degree of difference e(t).

Furthermore, the equipment management scheduler 150 may multiply the probability of abnormal event by the cost during the failure, which is input as the restraint condition, to calculate a cumulative sum of the cost. In this case, the equipment management scheduler 150 can estimate an expected cost for the abnormal event at a certain time point in the future.

The equipment management scheduler 150 can also add the maintenance cost input as the restraint condition to this result. In this case, like the predicted cost transition table illustrated in FIG. 8, the equipment management scheduler 150 can predict how the total cost costs for each kind of the equipment 300 changes in the case where the maintenance is not performed (the solid line in FIG. 8) and in the case where the maintenance is performed at a certain time point (the dashed line in FIG. 8).

Figure 8:
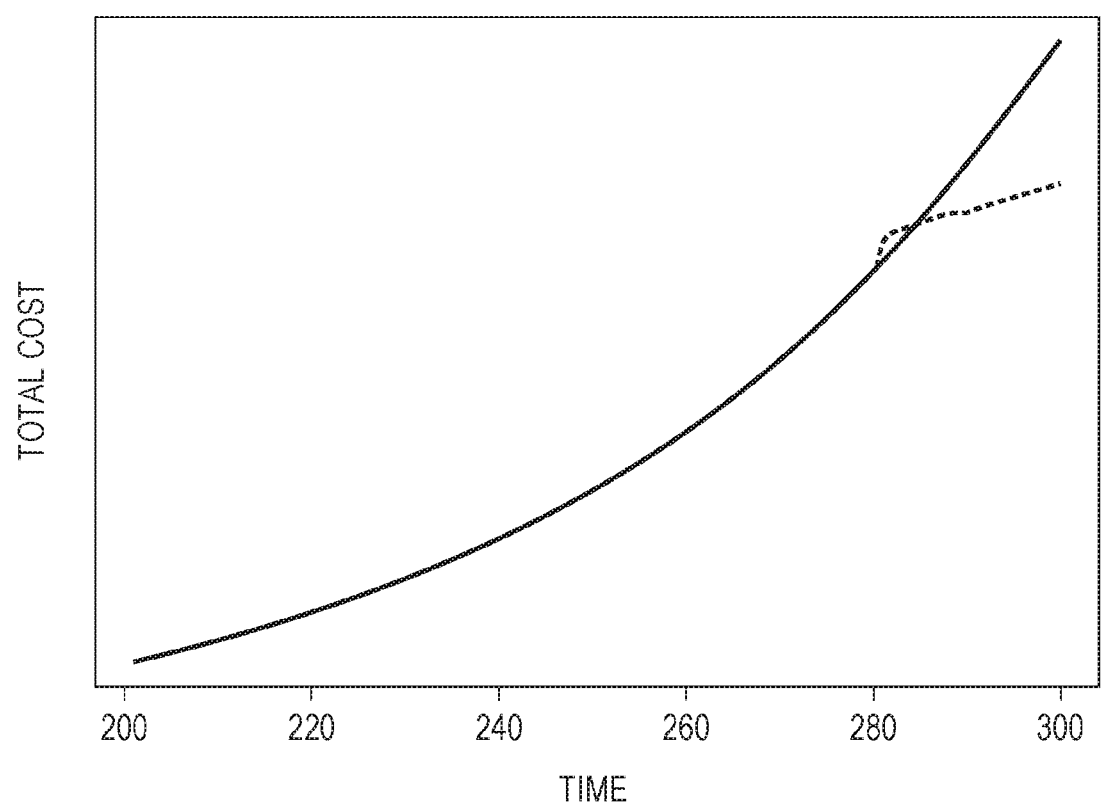
FIG. 8 is a drawing describing a predicted cost transition table showing a time change of a total cost when the maintenance is performed and not performed.

In the example illustrated in FIG. 8, performing the maintenance at the time point 280 temporarily increases the total cost due to the maintenance cost. However, a subsequent abnormal event in the equipment 300 is restrained. This reduces the total cost. At this time, changing the time point at which the maintenance is performed also changes the transition of the total cost.

The equipment management scheduler 150 can perform such prediction on the respective pieces of equipment 300. This allows the equipment management scheduler 150 to calculate a scheduling that at which setting timing of the maintenance of the respective pieces of equipment 300, effective preservation of the entire equipment group is possible under the restraint condition.

As the scheduling, mathematical programming such as linear programming and heuristics such as genetic algorithm can be used. As an objective function for optimization, the use of minimization of timely variation of the degree of difference e(t) and the like is considered.

Figure 9:
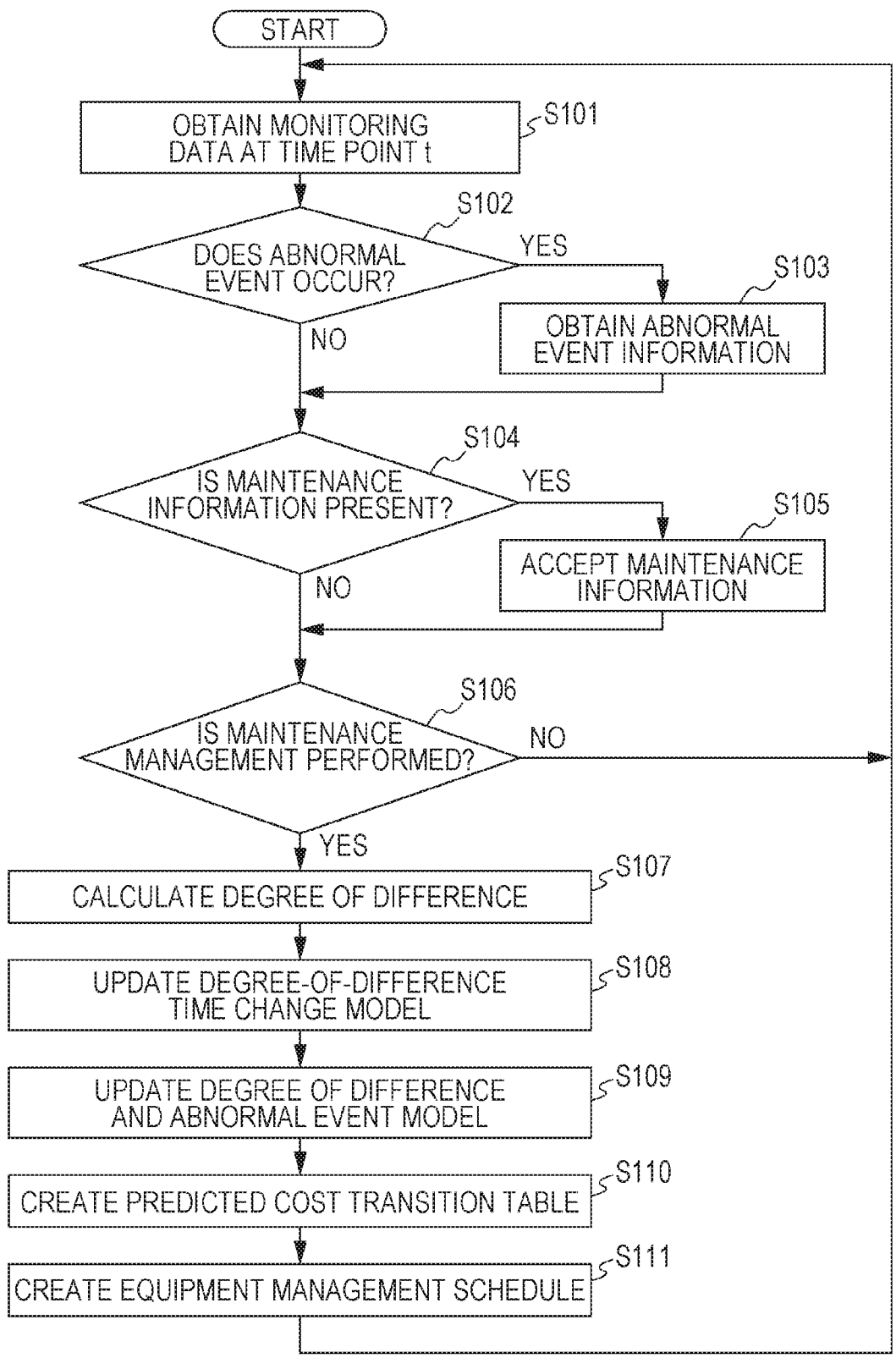
FIG. 9 is a flowchart describing operations of an equipment maintenance management system.

The following describes operations of the equipment maintenance management system 100 with the above-described configuration with reference to the flowchart in FIG. 9.

The monitoring data obtainer 110 obtains the monitoring data at the time point t real-time from the control system 220 (S101). The interval to be obtained can be any given interval. If the abnormal event occurs in the equipment 300

(S102: Yes), the equipment abnormal event information obtainer 120 obtains abnormal event information (S103). When the maintenance information on the equipment 300 is present (S104: Yes), the maintenance information input unit 130 accepts the maintenance information (S105).

A maintenance management process by the equipment maintenance management system 100, for example, may be periodically performed or may be performed by a request from the operator. When the maintenance management process is not performed (S106: No), the monitoring data is repeatedly collected (S101).

When the maintenance management process is performed (S106: Yes), the degree-of-difference calculator 142 calculates the degree of difference e(t) at each time point using the equipment model and the monitoring data (S107). However, the degree-of-difference calculator 142 may calculate the degree of difference e(t) whenever the monitoring data is obtained.

The degree-of-difference time change predictor 143 updates the degree-of-difference time change model p(e|t, m) based on the calculated degree of difference e(t) to predict the time change of the degree of difference e(t) (S108). For example, the degree-of-difference time change predictor 143 may display the predicted value obtained from the updated degree-of-difference time change model p(e|t, m) in a graph format or may output the predicted value to the outside. This ensures visualizing the time change of the degree of difference e(t).

The degree-of-difference-abnormal event relationship evaluator 144 uses the calculated degree of difference e(t) and the abnormal event information to update the abnormal event model p(q|e) (S109). This ensures statistical evaluation of the relationship between the degree of difference e(t) and the abnormal event. For example, the degree-of-difference-abnormal event relationship evaluator 144 may display the updated abnormal event model p(q|e) in a graph format or may output the updated abnormal event model p(q|e) to the outside.

The equipment management scheduler 150 predicts the probability of abnormal event from the predicted value of the degree of difference e(t) and the abnormal event model. Furthermore, the equipment management scheduler 150 creates the predicted cost transition table using the restraint condition (S110). The Equipment management scheduler 150 may display the created predicted cost transition table in a graph format or may output the created predicted cost transition table to the outside. At this time, the equipment management scheduler 150 may include the change in cost when the maintenance is performed at any time point in the predicted cost transition table. That is, the equipment management scheduler 150 may simulate the cost transition in the case where the equipment 300 is maintained. This ensures simulating an effect brought by the maintenance. The predicted cost transition table is preferably created for each kind of the equipment 300.

Furthermore, the equipment management scheduler 150 may optimize the execution timing of maintenance of the equipment 300 based on the simulation for the cost transition. That is, the equipment management scheduler 150 uses the predicted cost transition table to perform an optimization process (optimization of execution timing of equipment maintenance) to obtain information on at which time point that the equipment 300 is maintained, the total cost can be saved. The equipment management scheduler 150 creates and outputs an equipment management schedule based on the result of this optimization process (S111).

As described above, the equipment maintenance management system of this embodiment uses the degree of difference estimated from the equipment model and the real-time monitoring data as the estimated deterioration index. This predicts the cost transition regarding equipment maintenance based on the statistic evaluation of the predicted time change of the degree of difference and the relationship between the degree of difference and the abnormal event. This ensures efficiently designing the maintenance plan.

The above-described example uses the degree of difference as the estimated deterioration index of the equipment. The estimated deterioration index of the equipment is not limited to the degree of difference but may be another index having a correlation relationship with the probability of abnormal event.

It can also be said that the embodiment of the present disclosure is an equipment maintenance management system and an equipment maintenance management method that perform maintenance management of equipment disposed in a plant and the like.

The degree-of-difference calculator 142 may be a block to which the equipment model has been defined and that calculates the degree of difference e(t) using the equipment model with respect to the real-time monitoring data x(t) at the time point t of the equipment obtained by the monitoring data obtainer 110.

In the case of the deterministic model, when the linear relational expression such as the multiple regression analysis and the principal component analysis, the nonlinear relational expression such as the polynomial regression, the kernel regression, and the neural network, or the physical property of the equipment 300 has been known, the deterministic model can be created using the physical model based on these knowledge. In the case of the stochastic model, a model that uses the output of the deterministic model as an average and adds the Gaussian observation noise to the average and the like can be considered.

When the relational expression for the equipment model is given as simultaneous equations, the residual error becomes a multidimensional vector. In view of this, a square sum of the residual error and the like can be used as the degree of difference e(t). The abnormal event model p(q|e) at a start is any given model, and any given method for updating the abnormal event model p(q|e) is employed. As the model, for example, logistic regression analysis and the neural network can be used.

The embodiment of the present disclosure may be the following first to fourth equipment maintenance management systems and first equipment maintenance management method.

The first equipment maintenance management system includes a monitoring data obtainer, an equipment abnormal event information obtainer, a deterioration index calculator, a time change predictor, a relationship evaluator, and a scheduler. The monitoring data obtainer is configured to obtain real-time monitoring data regarding equipment. The equipment abnormal event information obtainer is configured to obtain abnormal event information occurred in the equipment. The deterioration index calculator is configured to calculate an estimated deterioration index of the equipment estimated from an equipment model and the obtained monitoring data. The equipment model is created by modeling a relationship between the real-time monitoring data of the equipment in a normal state. The time change predictor is configured to predict a time change of the estimated deterioration index. The relationship evaluator is configured to statistically evaluate a relationship between the estimated deterioration index and a probability of the abnormal event. The scheduler is configured to estimate a cost in a future caused by the abnormal event. The cost is estimated based on the predicted time change of the estimated deterioration index and a relationship between the estimated deterioration index and the probability of the abnormal event.

The second equipment maintenance management system according to the first equipment maintenance management system is configured as follows. The scheduler is configured to simulate a cost transition when equipment maintenance is performed.

The third equipment maintenance management system according to the second equipment maintenance management system is configured as follows. The scheduler is configured to optimize a time point of execution of the equipment maintenance based on the simulation for the cost transition.

The fourth equipment maintenance management system according to any one of the first to third equipment maintenance management systems is configured as follows. The relationship evaluator is configured to statistically evaluate the relationship between the estimated deterioration index and the probability of the abnormal event considering presence/absence of maintenance for the equipment.

The first equipment maintenance management method includes a monitoring data obtaining step, an equipment abnormal event information obtaining step, a deterioration index calculating step, a time change predicting step, a relationship evaluating step, and an estimating step. The monitoring data obtaining step obtains real-time monitoring data regarding equipment. The equipment abnormal event information obtaining step obtains abnormal event information occurred in the equipment. The deterioration index calculating step calculates an estimated deterioration index of the equipment estimated from an equipment model and the obtained monitoring data. The equipment model is created by modeling a relationship between the real-time monitoring data of the equipment in a normal state. The time change predicting step predicts a time change of the estimated deterioration index. The relationship evaluating step statistically evaluates a relationship between the estimated deterioration index and a probability of the abnormal event. The estimating step estimates a cost in a future caused by the abnormal event. The cost is estimated based on the predicted time change of the estimated deterioration index and a relationship between the estimated deterioration index and the probability of the abnormal event.

The first equipment maintenance management system and the first equipment maintenance management method statistically evaluate the relationship between the estimated deterioration index, which is the deterioration index of the equipment estimated from the monitoring data, and the abnormal event. This further clarifies the meaning of the estimated deterioration index and ensures designing an appropriate maintenance plan.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An equipment maintenance management system comprising:
    at least one memory configured to store computer program code; and
    at least one processor configured to access the at least one memory and operate according to the computer program code, the computer program code including:
        monitoring data code configured to cause at least one of the at least one processor to obtain, from a control system that controls an equipment, real-time monitoring data of the equipment at a time point t;
        equipment abnormal event information code configured to cause at least one of the at least one processor to obtain abnormal event information on an abnormal event that occurred in the equipment;
        deterioration index code configured to cause at least one of the at least one processor to calculate an estimated deterioration index of the equipment as a degree of difference e(t) from a normal state of the equipment from the obtained real-time monitoring data at the time point t and an equipment model, the equipment model obtained by monitoring a relationship between plural pieces of real-time monitoring data in the normal state and expressing a behavior of the equipment in the normal state by a relational expression using the plural pieces of real-time monitored data;
        time change predictor code configured to cause at least one of the at least one processor to predict a time change of the estimated deterioration index;
        relationship evaluator code configured to cause at least one of the at least one processor to create an abnormal event model that models a statistical relationship between the estimated deterioration index and a probability of the abnormal event; and
        scheduler code configured to cause at least one of the at least one processor to predict a probability of an abnormal event in a future from a predicted value of the degree of difference e(t) and the abnormal event model, create a predicted cost transition table based on the abnormal event model and a restrain condition, optimize a time of maintenance of the equipment based on the predicted cost transition table, and create and output, on a display, an equipment maintenance schedule of the equipment based on the optimized time.

2. The equipment maintenance management system according to claim 1, wherein
    the scheduler code is configured to cause at least one of the at least one processor to simulate a cost transition when equipment maintenance is performed.

3. The equipment maintenance management system according to claim 2, wherein
    the scheduler code is configured to cause at least one of the at least one processor to optimize execution timing of the equipment maintenance based on the simulation for the cost transition.

4. The equipment maintenance management system according to claim 3, wherein
    the relationship evaluator code is configured to cause at least one of the at least one processor to statistically evaluate the relationship between the estimated deterioration index and the probability of the abnormal event considering presence/absence of maintenance for the equipment.

5. The equipment maintenance management system according to claim 2, wherein
the relationship evaluator code is configured to cause at least one of the at least one processor to statistically evaluate the relationship between the estimated deterioration index and the probability of the abnormal event considering presence/absence of maintenance for the equipment.

6. The equipment maintenance management system according to claim 1, wherein
the relationship evaluator code is configured to cause at least one of the at least one processor to statistically evaluate the relationship between the estimated deterioration index and the probability of the abnormal event considering presence/absence of maintenance for the equipment.

7. An equipment maintenance management method comprising:
obtaining, from a control system that controls an equipment, real-time monitoring data of the equipment at a time point t;
obtaining abnormal event information on an abnormal event that occurred in the equipment;
calculating an estimated deterioration index of the equipment as a degree of difference e(t) from a normal state of the equipment from the obtained real-time monitoring data at the time point t and an equipment model, the equipment model obtained by monitoring a relationship between plural pieces of real-time monitoring data in the normal state and expressing a behavior of the equipment in the normal state by a relational expression using the plural pieces of real-time monitored data;
predicting a time change of the estimated deterioration index;
creating an abnormal event model that models a statistical relationship between the estimated deterioration index and a probability of the abnormal event;
predicting a probability of an abnormal event in a future from a predicted value of the degree of difference e(t) and the abnormal event model;
creating a predicted cost transition table based on the abnormal event model and a restrain condition;
optimizing a time of maintenance of the equipment based on the predicted cost transition table; and
creating and outputting, on a display, an equipment maintenance schedule of the equipment based on the optimized time.

* * * * *